(12) United States Patent
Yang et al.

(10) Patent No.: US 9,154,266 B2
(45) Date of Patent: Oct. 6, 2015

(54) UPLINK CONTROL INFORMATION TRANSMISSION METHOD AND APPARATUS IN MULTICARRIER SYSTEM

(75) Inventors: Suck Chel Yang, Anyang-si (KR); Min Gyu Kim, Anyang-si (KR); Joon Kui Ahn, Anyang-si (KR); Dong Youn Seo, Anyang-si (KR)

(73) Assignee: LG Electronics Inc., Seoul (KR)

( * ) Notice: Subject to any disclaimer, the term of this patent is extended or adjusted under 35 U.S.C. 154(b) by 4 days.

(21) Appl. No.: 13/504,835

(22) PCT Filed: Oct. 26, 2010

(86) PCT No.: PCT/KR2010/007362
§ 371 (c)(1),
(2), (4) Date: Apr. 27, 2012

(87) PCT Pub. No.: WO2011/052961
PCT Pub. Date: May 5, 2011

(65) Prior Publication Data
US 2012/0213187 A1  Aug. 23, 2012

Related U.S. Application Data

(60) Provisional application No. 61/255,842, filed on Oct. 28, 2009, provisional application No. 61/374,586, filed on Aug. 17, 2010.

(30) Foreign Application Priority Data

Oct. 20, 2010  (KR) ........................ 10-2010-0102196

(51) Int. Cl.
*H04W 72/04* (2009.01)
*H04L 1/18* (2006.01)
(Continued)

(52) U.S. Cl.
CPC ............ *H04L 1/1861* (2013.01); *H04L 1/0027* (2013.01); *H04L 1/1671* (2013.01);
(Continued)

(58) Field of Classification Search
CPC ...................................................... H04W 28/04
USPC .................................................. 370/328–347
See application file for complete search history.

(56) References Cited

U.S. PATENT DOCUMENTS

| 2009/0110038 A1 | 4/2009 | Montojo et al. |
| 2010/0002647 A1 | 1/2010 | Ahn et al. |

(Continued)

FOREIGN PATENT DOCUMENTS

| CN | 101491153 A | 7/2009 |
| CN | 101507341 A | 8/2009 |

(Continued)

OTHER PUBLICATIONS

R1-074656, "Embeded Coding for PUCCH Transmissions of CQI+ACK/NACK", 3GPP TSG-RAN WG1 #50bis, Nov. 5-9, 2007, pp. 1-7.

(Continued)

*Primary Examiner* — Andrew Chriss
*Assistant Examiner* — Peter Mak
(74) *Attorney, Agent, or Firm* — Birch, Stewart, Kolasch & Birch, LLP

(57) ABSTRACT

A method for transmitting uplink control information of a user equipment in a multi-carrier system is provided. The method includes: transmitting each of acknowledgement/not-acknowledgement (ACK/NACK) for downlink data transmitted by a base station through multiple downlink component carriers; and transmitting channel state information indicating a state of a downlink channel to the base station, wherein each of the ACK/NACK and the channel state information are allocated to the same uplink control channel resource in a subframe, and if each of the ACK/NACK and the channel state information are reserved to be transmitted on the same subframe, each of the ACK/NACK only is transmitted. Accordingly, a user equipment can transmit uplink control information while preserving a single-carrier property of an uplink signal in a multi-carrier system using carrier aggregation.

8 Claims, 14 Drawing Sheets

(51) Int. Cl.
*H04L 1/00* (2006.01)
*H04L 1/16* (2006.01)
*H04L 5/00* (2006.01)

(52) U.S. Cl.
CPC ............ *H04L1/1854* (2013.01); *H04L 5/0055* (2013.01); *H04L 5/0057* (2013.01); *H04L 5/001* (2013.01); *H04L 5/0019* (2013.01)

(56) References Cited

U.S. PATENT DOCUMENTS

| | | | |
|---|---|---|---|
| 2010/0098012 A1* | 4/2010 | Bala et al. | 370/329 |
| 2010/0226327 A1* | 9/2010 | Zhang et al. | 370/329 |
| 2010/0238877 A1* | 9/2010 | Nam et al. | 370/329 |
| 2011/0034175 A1* | 2/2011 | Fong et al. | 455/450 |
| 2011/0205981 A1* | 8/2011 | Koo et al. | 370/329 |

FOREIGN PATENT DOCUMENTS

| | | |
|---|---|---|
| KR | 10-2008-0088525 A | 10/2008 |
| WO | WO 2009/022873 A2 | 2/2009 |

OTHER PUBLICATIONS

R1-074721, "Detail of ACK/NACK and CQI transmission", 3GPP TSG-RAN WG1 Meeting #51 bis, Nov. 5-9, 2007, 3 pages.
R1-092501, "ACK/NACK PUCCH for LTE-Advanced", 3GPP TSG-RAN WG1 #57bis, Jun. 29-Jul. 3, 2009, 6 pages.
Samsung, "Simultaneous UE transmission of ACK/NAK and CQI", 3GPP TSG RAN WG1 Meeting #50, R1-073540, Athens, Greece, Aug. 20-24, 2007, 2 pages.
Samsung, "UL ACK/NAK Transmission in LTE-A", 3GPP TSG RAN WG1 #58bis, R1-094083, Miyazaki, Japan, Oct. 12-16, 2009, pp. 1-3.

* cited by examiner

UPLINK CONTROL INFORMATION TRANSMISSION METHOD AND APPARATUS IN MULTICARRIER SYSTEM

CROSS REFERENCE TO RELATED APPLICATIONS

This application is the National Phase of PCT/KR2010/007362 filed on Oct. 26, 2010, which claims priority under 35 U.S.C. 119(e) to U.S. Provisional Application Nos. 61/255,842 and 61/374,586 filed on Oct. 28, 2009 and Aug. 17, 2010 respectively, and under 35 U.S.C 119(a) to Patent Application No. 10-2010-0102196 filed in the Republic of Korea on Oct. 20, 2010, all of which are hereby expressly incorporated by reference into the present application.

TECHNICAL FIELD

The present invention relates to wireless communications, and more particularly, to a method and apparatus for transmitting uplink control information in a multi-carrier system.

BACKGROUND ART

Standardization works of international mobile telecommunication (IMT)-advanced which is a next generation (i.e., post $3^{rd}$ generation) mobile communication system are carried out in the international telecommunication union radio communication sector (ITU-R). The IMT-advanced aims at support of an Internet protocol (IP)-based multimedia service with a data transfer rate of 1 Gbps in a stationary or slowly moving state or 100 Mbps in a fast moving state.

3rd generation partnership project (3GPP) is a system standard satisfying requirements of the IMT-advanced, and prepares LTE-advanced (LTE-A) which is an improved version of long term evolution (LTE) based on orthogonal frequency division multiple access (OFDMA)/single carrier-frequency division multiple access (SC-FDMA) transmission. The LTE-A is one of promising candidates for the IMT-advanced.

Carrier aggregation (CA) is one of candidate techniques to be used in LTE-A. The CA is a technique capable of configuring a broadband by aggregating multiple narrowband component carriers (CCs). In a wireless communication system using the CA, multiple control information can be transmitted through one uplink CC. For example, when acknowledgement/not-acknowledgement (ACK/NACK) for data transmitted through each of multiple downlink CCs is transmitted through one uplink CC, there may be a case where multiple ACK/NACKs must be transmitted. That is, unlike the conventional single-carrier system, the multi-carrier system may occasionally have to transmit multiple control information.

Accordingly, there is a need for a method and apparatus for transmitting uplink control information in a multi-carrier system.

SUMMARY OF INVENTION

Technical Problem

The present invention provides a method and apparatus for transmitting uplink control information in a multi-carrier system.

Technical Solution

According to one aspect of the present invention, a method for transmitting uplink control information of a user equipment in a multi-carrier system is provided. The method includes: transmitting each of acknowledgement/not-acknowledgement (ACK/NACK) for downlink data transmitted by a base station through multiple downlink component carriers; and transmitting channel state information indicating a state of a downlink channel to the base station, wherein each of the ACK/NACK and the channel state information are allocated to the same uplink control channel resource in a subframe, and if each of the ACK/NACK and the channel state information are reserved to be transmitted on the same subframe, each of the ACK/NACK only is transmitted.

In the aforementioned aspect of the present invention, in the uplink control channel resource, one slot may include 7 single carrier-frequency division multiple access (SC-FDMA) symbols in a normal cyclic prefix (CP) case, and the each of ACK/NACK may be allocated to an SC-FDMA symbol other than $2^{nd}$ and $6^{th}$ SC-FDMA symbols in which a reference signal is transmitted in the slot.

In addition, in the uplink control channel resource, one slot may include 6 SC-FDMA symbols in an extended CP case, and the each of ACK/NACK may be allocated to an SC-FDMA symbol other than a $4^{th}$ SC-FDMA symbol in which a reference signal is transmitted in the slot.

In addition, the method for transmitting the uplink control information of the user equipment further includes transmitting a scheduling request. If the scheduling request is reserved to be transmitted in the same subframe in which the each of ACK/NACK is transmitted, the scheduling request may be transmitted by modulating a symbol for transmitting a reference signal in a subframe in which the each of ACK/NACK is transmitted.

According to another aspect of the present invention, a method for transmitting uplink control information of a user equipment in a multi-carrier system is provided. The method includes: receiving downlink data through one or more downlink component carriers from a base station; transmitting ACK/NACK for the downlink data; and transmitting channel state information indicating a state of a downlink channel to the base station, wherein if the ACK/NACK is reserved to be transmitted in a channel quality indicator (CQI) subframe reserved for transmission of the channel state information, and is a response for downlink data transmitted by the base station through a single downlink component carrier, the channel state information and the ACK/NACK are transmitted simultaneously in the CQI subframe.

In the aforementioned aspect of the present invention, the single downlink component carrier may be a downlink component carrier linked to an uplink component carrier for transmitting the channel state information.

In addition, the single downlink component carrier may be a downlink component carrier configured to transmit downlink control information by the base station to the user equipment.

In addition, the ACK/NACK may be transmitted by modulating a symbol in which a reference signal is transmitted in a subframe with a normal CP case.

In addition, the ACK/NACK may be transmitted by being jointly encoded with the channel state information in a subframe with an extended CP case.

In addition, the method for transmitting the uplink control information of the user equipment further includes transmitting a scheduling request, wherein if the scheduling request is reserved to be transmitted in the same subframe in which the channel state information is transmitted, the scheduling request is transmitted by modulating a symbol for transmitting a reference signal in a subframe in which the channel state information is transmitted.

According to another aspect of the present invention, a user equipment for transmitting uplink control information in a multi-carrier system is provided. The user equipment includes: a radio frequency (RF) unit for transmitting and receiving a radio signal; and a processor coupled to the RF unit, wherein the processor transmits each of ACK/NACK for downlink data transmitted by a base station through multiple downlink component carriers, and transmits channel state information indicating a state of a downlink channel to the base station. Each of the ACK/NACK and the channel state information are allocated to the same uplink control channel resource in a subframe. If each of the ACK/NACK and the channel state information are reserved to be transmitted on the same subframe, each of the ACK/NACK only is transmitted.

Advantageous Effects

According to the present invention, a user equipment can transmit uplink control information while preserving a single-carrier property of an uplink signal in a multi-carrier system using carrier aggregation.

MODE FOR INVENTION

The technology described below can be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), etc. The CDMA can be implemented with a radio technology such as universal terrestrial radio access (UTRA) or CDMA-2000. The TDMA can be implemented with a radio technology such as global system for mobile communications (GSM)/general packet ratio service (GPRS)/enhanced data rate for GSM evolution (EDGE). The OFDMA can be implemented with a radio technology such as institute of electrical and electronics engineers (IEEE) 802.11 (Wi-Fi), IEEE 802.16 (WiMAX), IEEE 802-20, evolved UTRA (E-UTRA), etc. The UTRA is a part of a universal mobile telecommunication system (UMTS). 3rd generation partnership project (3GPP) long term evolution (LTE) is a part of an evolved UMTS (E-UMTS) using the E-UTRA. The 3GPP LTE uses the OFDMA in a downlink and uses the SC-FDMA in an uplink. LTE-advance (LTE-A) is an evolution of the 3GPP LTE. For clarity, the following description will focus on the 3GPP LTE/LTE-A. However, technical features of the present invention are not limited thereto.

Figure 1:
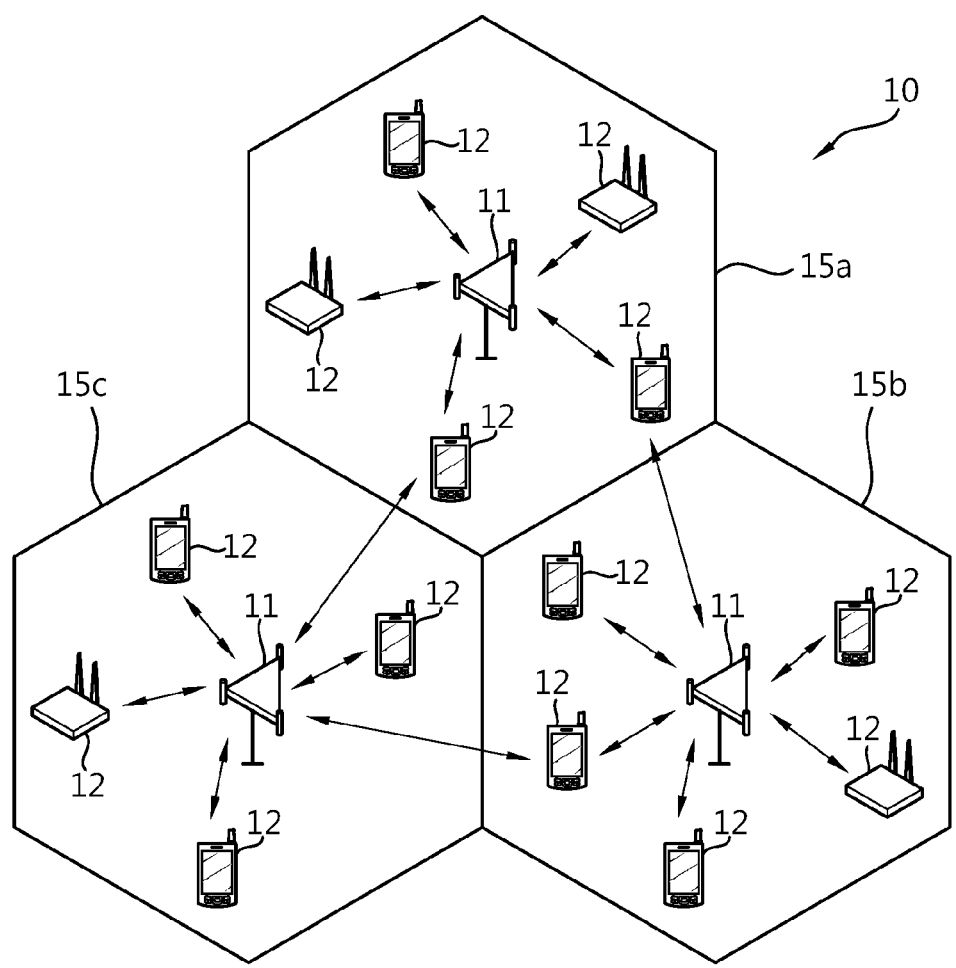
FIG. 1 shows a wireless communication system.

FIG. 1 shows a wireless communication system.

Referring to FIG. 1, a wireless communication system 10 includes at least one base station (BS) 11. Each BS 11 provides a communication service to a specific geographical region 15 generally referred to as a cell. The cell can be divided into a plurality of regions, and each region can be referred to as a sector. A user equipment (UE) 12 may be fixed or mobile, and may be referred to as another terminology, such as a mobile station (MS), a mobile terminal (MT), a user terminal (UT), a subscriber station (SS), a wireless device, a personal digital assistant (PDA), a wireless modem, a handheld device, etc. The BS 11 is generally a fixed station that communicates with the UE 12 and may be referred to as another terminology, such as an evolved node-B (eNB), a base transceiver system (BTS), an access point, etc.

Hereinafter, a downlink (DL) denotes a communication link from the BS to the UE, and an uplink (UL) denotes a communication link from the UE to the BS. In the DL, a transmitter may be a part of the BS, and a receiver may be a part of the UE. In the UL, the transmitter may be a part of the UE, and the receiver may be a part of the BS.

The wireless communication system may be any one of a multiple-input multiple-output (MIMO) system, a multiple-input single-output (MISO) system, a single-input single-output (SISO) system, or a single-input multiple-output (SIMO) system. The MIMO system uses multiple transmit (Tx) antennas and multiple receive (Rx) antennas. The MISO system uses multiple Tx antennas and one Rx antenna. The SISO system uses one Tx antenna and one Rx antenna. The SIMO system uses one Tx antenna and multiple Rx antennas.

Figure 2:
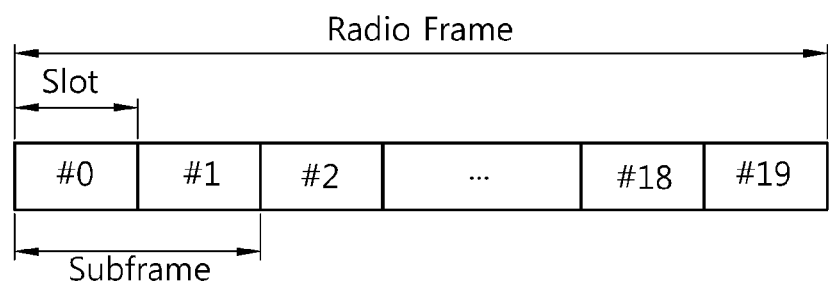
FIG. 2 shows a radio frame structure of $3^{rd}$ generation partnership project (3GPP) long term evolution (LTE).

FIG. 2 shows a radio frame structure of 3GPP LTE.

Referring to FIG. 2, a radio frame consists of 10 subframes. One subframe consists of 2 slots. One subframe may have a length of 1 millisecond (ms), and one slot may have a length of 0.5 ms. A time for transmitting one subframe is defined as a transmission time interval (TTI). The TTI may be a minimum unit of scheduling.

One slot may include multiple orthogonal frequency division multiplexing (OFDM) symbols in a time domain. Since the 3GPP LTE uses OFDMA in DL transmission, the OFDM symbol is for representing one symbol period, and can be referred to as other terms. For example, the OFDM symbol can also be referred to as an SC-FDMA symbol. Although it is described herein that one slot includes 7 OFDM symbols, the number of OFDM symbols included in one slot may change depending on a cyclic prefix (CP) length. According to 3GPP TS 36.211 V8.5.0(2008-12), in a normal CP case, one subframe includes 7 OFDM symbols, and in an extended CP case, one subframe includes 6 OFDM symbols. The radio frame structure is for exemplary purposes only, and thus the number of subframes included in the radio frame and the number of slots included in the subframe may change variously.

The sections 4.1 and 4.2 of 3GPP TS 36.211 V8.3.0 (2008-05) "Technical Specification Group Radio Access Network; Evolved Universal Terrestrial Radio Access (E-UTRA); Physical Channels and Modulation (Release 8)" can be incorporated herein by reference to explain the radio frame structure described with reference to FIG. 2.

Figure 3:
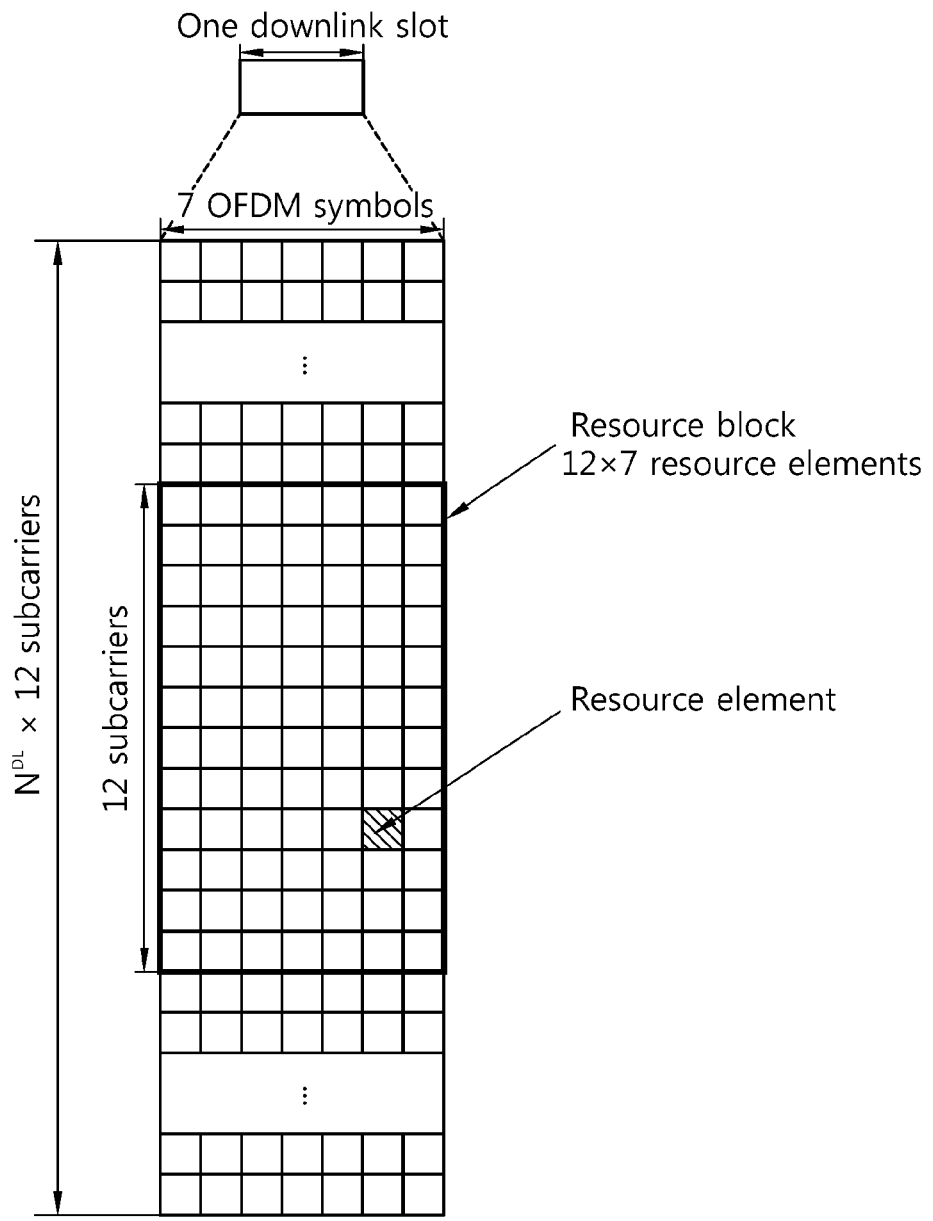
FIG. 3 shows an example of a resource grid for one downlink slot.

FIG. 3 shows an example of a resource grid for one DL slot.

In FDD and TDD radio frames, one slot includes multiple OFDM symbols in a time domain and multiple resource blocks (RBs) in a frequency domain. The RB is a resource allocation unit, and includes multiple consecutive subcarriers in one slot.

Referring to FIG. 3, a slot (e.g., a DL slot included in a DL subframe) includes multiple OFDM symbols in the time domain. Although it is described herein that one DL slot includes 7 OFDM symbols and one RB includes 12 subcarriers in the frequency domain, this is for exemplary purposes only, and thus the present invention is not limited thereto. A subcarrier spacing may be, for example, 15 kHz in the RB.

Each element on the resource grid is referred to as a resource element, and one RB includes 12×7 resource elements. The number $N^{DL}$ of RBs included in the DL slot depends on a DL transmission bandwidth determined in a cell. The resource grid described in FIG. 3 can also apply to UL transmission.

Figure 4:
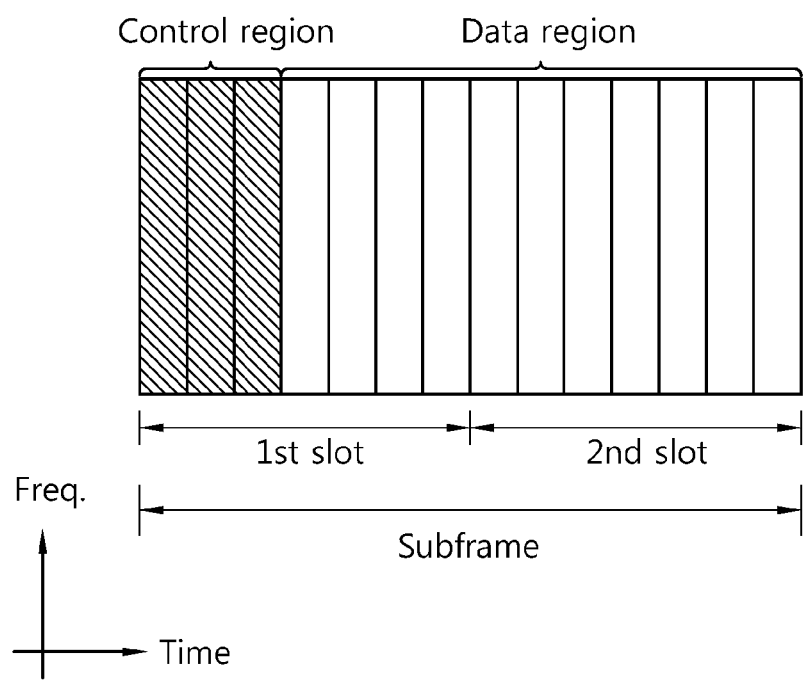
FIG. 4 shows a structure of a downlink subframe.

FIG. 4 shows a structure of a DL subframe.

Referring to FIG. 4, the subframe includes two consecutive slots. A maximum of three OFDM symbols located in a front portion of a $1^{st}$ slot within the subframe correspond to a control region to which a physical downlink control channel (PDCCH) is allocated. The remaining OFDM symbols correspond to a data region to which a physical downlink shared channel (PDSCH) is allocated. Examples of DL control channels include a physical downlink control channel (PDCCH), a physical control format indicator channel (PCFICH), a physical hybrid-ARQ indicator channel (PHICH), etc. The PCFICH is transmitted in a $1^{st}$ OFDM symbol of the subframe and carries information regarding the number of OFDM symbols used for transmission of the control channels in the subframe. The PHICH is a channel through which a response for UL transmission is transmitted, and carries an acknowledgement/not-acknowledgement (ACK/NACK) signal. Control information transmitted on the PDCCH is referred to as downlink control information (DCI). The DCI may include UL scheduling information on any UE or UE group, DL scheduling information, and/or a UL transmit power control command.

The PDCCH can carry a transport format, a downlink shared channel (DL-SCH)'s resource allocation, resource allocation information on an uplink shared channel (UL-SCH), paging information on a paging channel (PCH), system information on the DL-SCH, a resource allocation of a higher-layer control message such as a random access response transmitted on the PDSCH, an aggregation of transmit power control commands for individual UEs in any UE group, activation of a voice over Internet (VoIP), etc.

Multiple PDCCHs can be transmitted in the control region. A UE can monitor the multiple PDCCHs. The PDCCH is transmitted on an aggregation of one or several consecutive control channel elements (CCEs). The CCE is a logical allocation unit used to provide the PDCCH with a coding rate depending on a state of a radio channel. The CCE corresponds to multiple resource element groups (REGs). According to a correlation between the number of CCEs and a coding rate provided by the CCEs, a format of the PDCCH and the number of bits of an available PDCCH are determined. A BS determines a PDCCH format according to DCI to be transmitted to the UE, and appends cyclic redundancy check (CRC) to control information. The CRC is masked to a unique identifier depending on a usage or owner of the PDCCH. The unique identifier is referred to as a radio network temporary identifier (RNTI). If the PDCCH is for a specific UE, the unique identifier of the UE, e.g., cell-RNTI (C-RNTI) can be masked to the CRC. Alternatively, if the PDCCH is for a paging message, a paging indication identifier (e.g., a paging RNTI (P-RNTI)) can be masked to the CRC. If the PDCCH is for system information (more specifically, a system information block (SIB)), a system information identifier and system information RNTI (SI-RNTI) can be masked to the CRC. To indicate a random access response as a response for random access preamble transmission, random access-RNTI (RA-RNTI) can be masked to the CRC.

Figure 5:
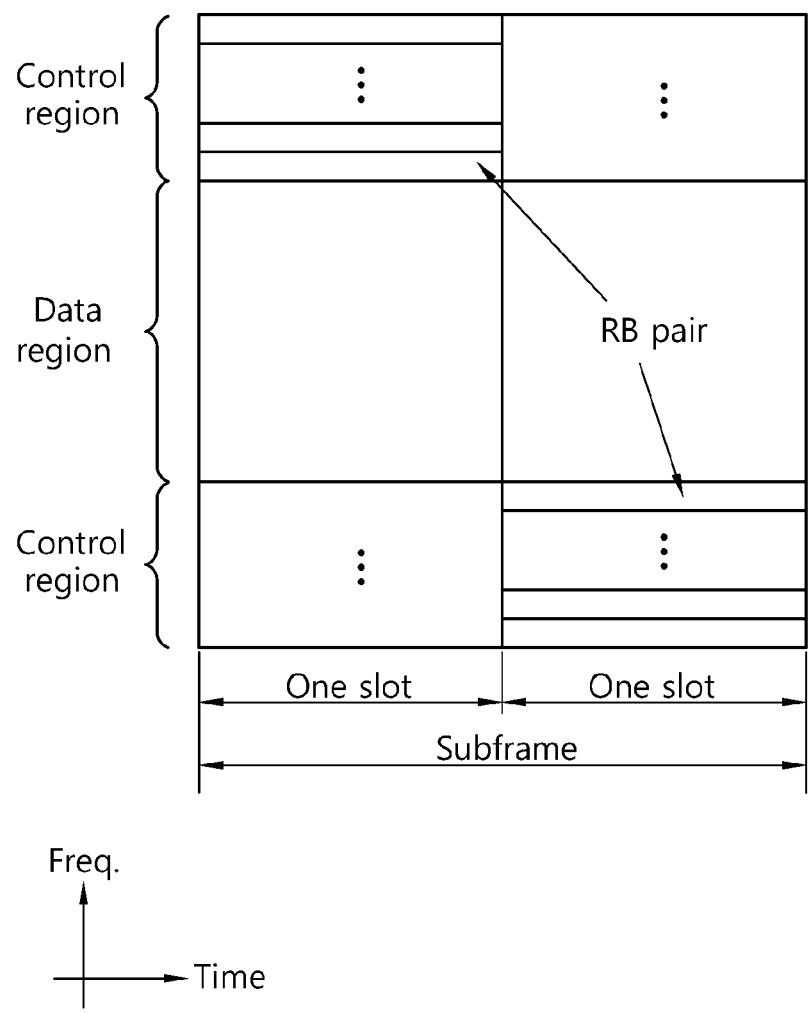
FIG. 5 shows a structure of an uplink subframe.

FIG. 5 shows a UL subframe structure.

Referring to FIG. 5, a UL subframe can be divided into a control region and a data region. A physical uplink control channel (PUCCH) for carrying UL control information is allocated to the control region. A region to which a physical uplink shared channel (PUSCH) for carrying user data is allocated to the data region. To preserve a single-carrier property, one UE does not simultaneously transmit the PUCCH and the PUSCH. The PUCCH for one UE is allocated in a pair of RBs. The RBs belonging to the RB pair occupy different subcarriers in each of two slots. This is called that the RB pair allocated to the PUCCH is frequency-hopped in a slot boundary.

Examples of the control information transmitted on the PUCCH include a scheduling request signal (hereinafter, SR), HARQ ACK/NACK (hereinafter, ACK/NACK), a channel quality indicator (CQI), etc. The ACK/NACK is a response for a DL data packet transmitted on the PDSCH. One ACK/NACK bit is transmitted in case of single-codeword DL transmission while two ACK/NACK bits are transmitted in case of two-codeword DL transmission. The CQI implies information on a DL channel, and may include a precoding matrix indicator (PMI) and a rank indicator (RI) which are fed back in association with MIMO transmission. The CQI can use 20 bits per subframe.

An amount of control information that can be transmitted in one subframe by the UE depends on the number of SC-FDMA symbols available for transmission of the control information. For example, the amount of transmissible control information can be determined according to the number of SC-FDMA symbols other than an SC-FDMA symbol to which an RS transmitted for coherent detection of the PUCCH is allocated.

The PUCCH supports several different formats depending on information to be signaled. That is, the PUCCH can support multiple formats. UL control information having a different number of bits for each subframe can be transmitted according to a modulation scheme. For example, when using a binary phase shift keying (BPSK) (i.e., a PUCCH format 1a), 1-bit UL control information can be transmitted on the PUCCH, and when using quadrature phase shift keying (QPSK) (i.e., a PUCCH format 1b), 2-bit UL control information can be transmitted on the PUCCH. In addition thereto, examples of the PUCCH format include a format 1, a format 2, a format 2a, a format 2b, etc. The PUCCH format supported in LTE and UL control information transmitted in the PUCCH format are shown Table 1 below.

TABLE 1

| PUCCH Format | Uplink control information(UCI) |
|---|---|
| Format 1 | Scheduling request(SR) (unmodulated wave form) |
| Format 1a | 1-bit HARQ ACK/NACK with/without SR |
| Format 1b | 2-bit HARQ ACK/NACK with/without SR |
| Format 2 | CQI(20 coded bits) |
| Format 2 | CQI and 1- or 2-bit HARQ ACK/NACK(20 bits) for extended CP only |
| Format 2a | CQI and 1-bit HARQ ACK/NACK(20 + 1 coded bits) |
| Format 2b | CQI and 2-bit HARQ ACK/NACK(20 + 2 coded bits) |

Figure 6:
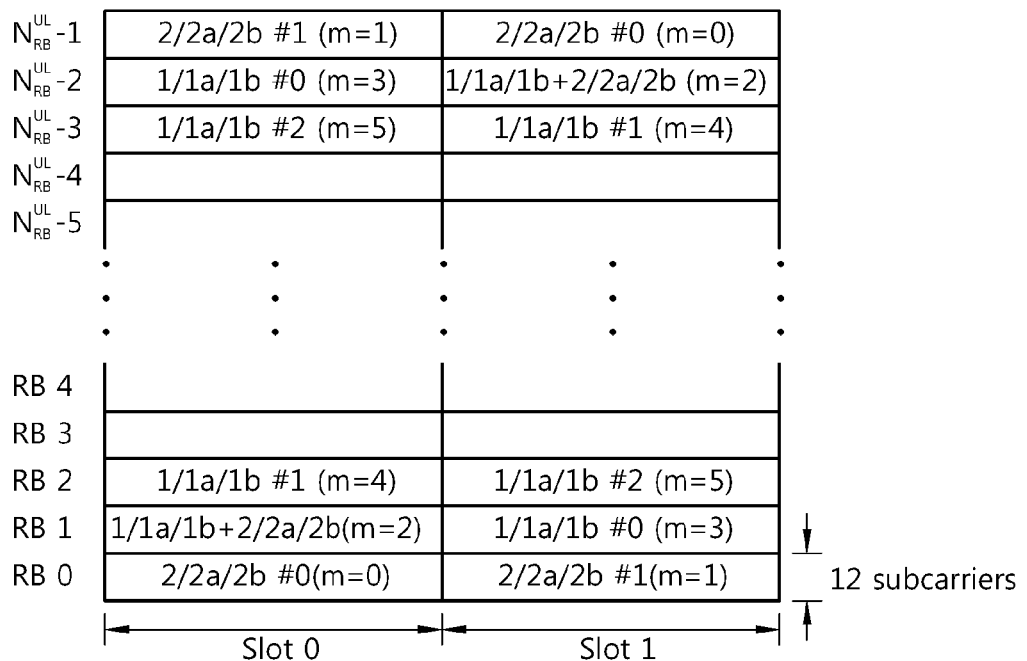
FIG. 6 shows physical mapping of a physical uplink control channel (PUCCH) format onto a PUCCH region.

FIG. 6 shows physical mapping of a PUCCH format onto a PUCCH region.

Referring to FIG. 6, the PUCCH formats 2/2a/2b are mapped and transmitted on the band-edge RBs (e.g., PUCCH region m=0, 1). A mixed PUCCH RB can be transmitted by being mapped to an adjacent RB (e.g., m=2) towards a center of the band in an RS to which the PUCCH formats 2/2a/2b are allocated. PUCCH formats 1/1a/1b by which SR and ACK/NACK are transmitted can be deployed to an RB (e.g., m=4 or m=5). The number $N^{(2)}_{RB}$ of available RBs with the PUCCH formats 2/2a/2b by which CQI is transmitted can be indicated by a UE through a broadcasting signal.

(1) CQI Transmission Using PUCCH Formats 2/2a/2b

A frequency and period used by a UE to feed back a CQI is controlled by a BS. In a time domain, both periodic CQI transmission and aperiodic CQI transmission are supported. The PUCCH format 2 is used for periodic CQI feedback only. The PUSCH is used for the aperiodic CQI transmission, whereby the BS specifically instructs the UE to send an individual CQI report embedded into a resource scheduled for UL data transmission.

Figure 7:
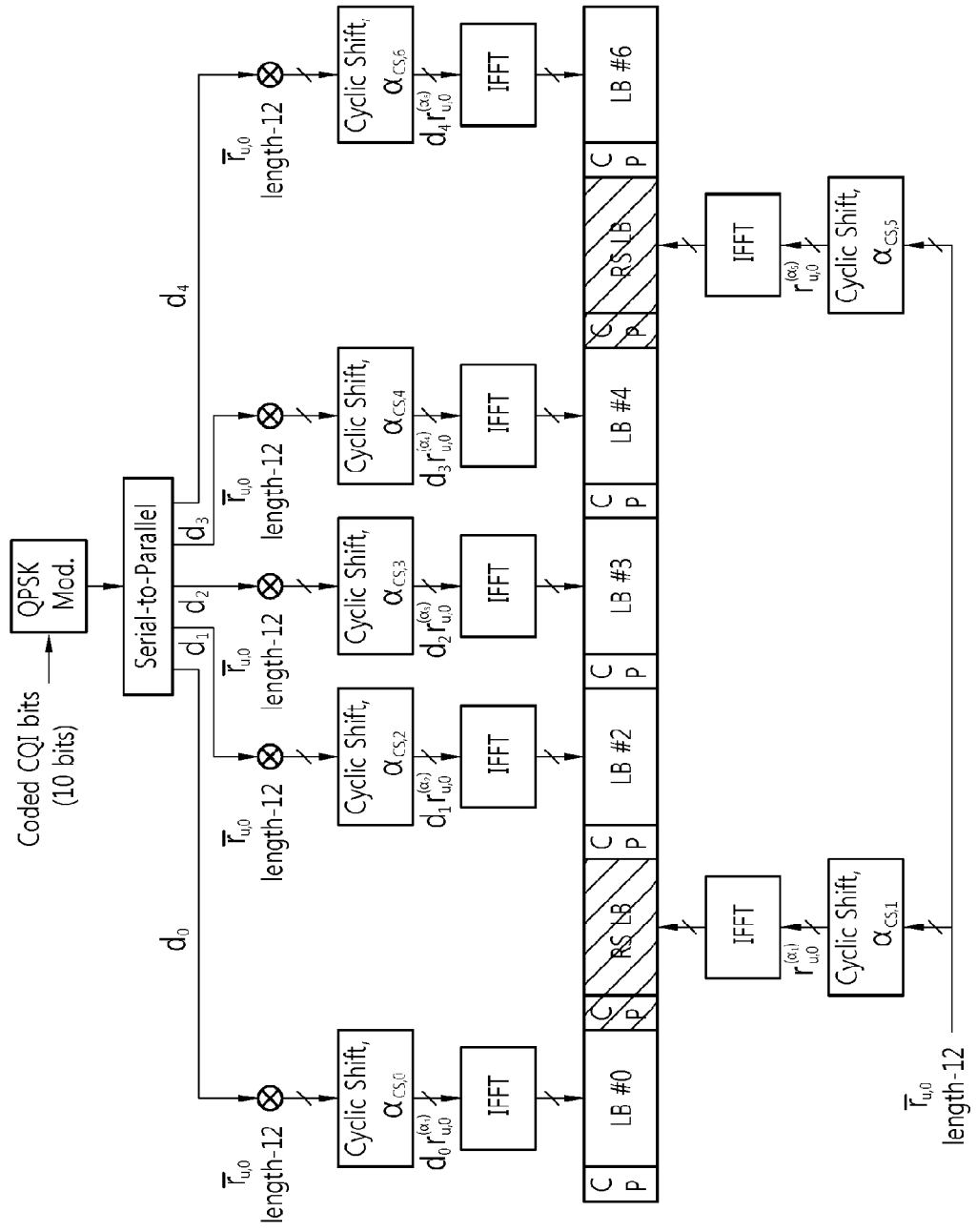
FIG. 7 shows a channel structure of PUCCH formats 2/2a/2b for one slot in a normal cyclic prefix (CP).

FIG. 7 shows a channel structure of PUCCH formats 2/2a/2b for one slot in a normal CP. As described above, the PUCCH formats 2/2a/2b are used in CQI transmission.

Referring to FIG. 7, in the normal CP case, SC-FDMA symbols 1 and 5 are used for a demodulation reference symbol (DM RS). In an extended CP case, an SC-FDMA symbol 3 is used for the DM RS.

10 CQI information bits are channel coded, for example, with a coding rate of 1/2, thereby generating 20 coded bits. A Reed-Muller code can be used in the channel coding. After scheduling (similarly to a case where PUSCH data is scrambled to a gold sequence having a length of 31), QPSK constellation mapping is performed to generate QPSK modulation symbols $d_0$ to $d_4$. Each QPSK modulation symbol is modulated by using a cyclic shift of a base RS sequence having a length of 12, and is then subjected to OFDM modulation. Then, the resultant symbol is transmitted in each of 10 SC-FDMA symbols in a subframe. 12 equally-spaced cyclic shifts allow 12 different UEs to be orthogonally multiplexed on the same PUCCH RB. A DM RS sequence applied to the SC-FDMA symbols 1 and 5 may be the base RS sequence having a length of 12.

The UE can be semi-statically configured by a higher layer signal to periodically report different types of CQI, PMI, and RI in the PUCCH by using a PUCCH resource index $n^{(2)}_{PUCCH}$. Herein, $n^{(2)}_{PUCCH}$ indicates both a cyclic shift and a PUCCH region used in transmission of the PUCCH formats 2/2a/2b.

(2) Multiplexing of CQI and ACK/NACK of UE

In LTE, simultaneous transmission of ACK/NACK and CQI in the same subframe can be enabled or disabled. In a case where simultaneous transmission of the ACK/NACK and the CQI is disabled, a UE may need to transmit the ACK/NACK on a PUCCH of a subframe in which CQI feedback is configured. In this case, the CQI is dropped, and only the ACK/NACK is transmitted using the PUCCH formats 1a/1b.

Simultaneous transmission of the ACK/NACK and the CQI in the same subframe can be achieved through UE-specific higher layer signaling. When simultaneous transmission is enabled, 1-bit or 2-bit ACK/NACK information needs to be multiplexed to the same PUCCH RB in a subframe in which a BS scheduler permits simultaneous transmission of the CQI and the ACK/NACK. In this case, it is necessary to preserve a single-carrier property having a low cubic metric (CM). A method of multiplexing the CQI and the ACK/NACK while preserving the single-carrier property is different between a normal CP case and an extended CP case.

First, when 1-bit or 2-bit ACK/NACK and CQI are transmitted together by using the PUCCH formats 2a/2b in the normal CP, ACK/NACK bits are not scrambled, and are subjected to BPSK (in case of 1 bit)/QPSK (in case of 2 bits) modulation to generate a single HARQ ACK/NACK modulation symbol $d_{HARQ}$. The ACK is encoded as a binary '1', and the NACK is encoded as a binary '0'. The single HARQ ACK/NACK modulation symbol $d_{HARQ}$ is used to modulate a second RS symbol in each slot. That is, the ACK/NACK is signaled by using an RS.

Figure 8:
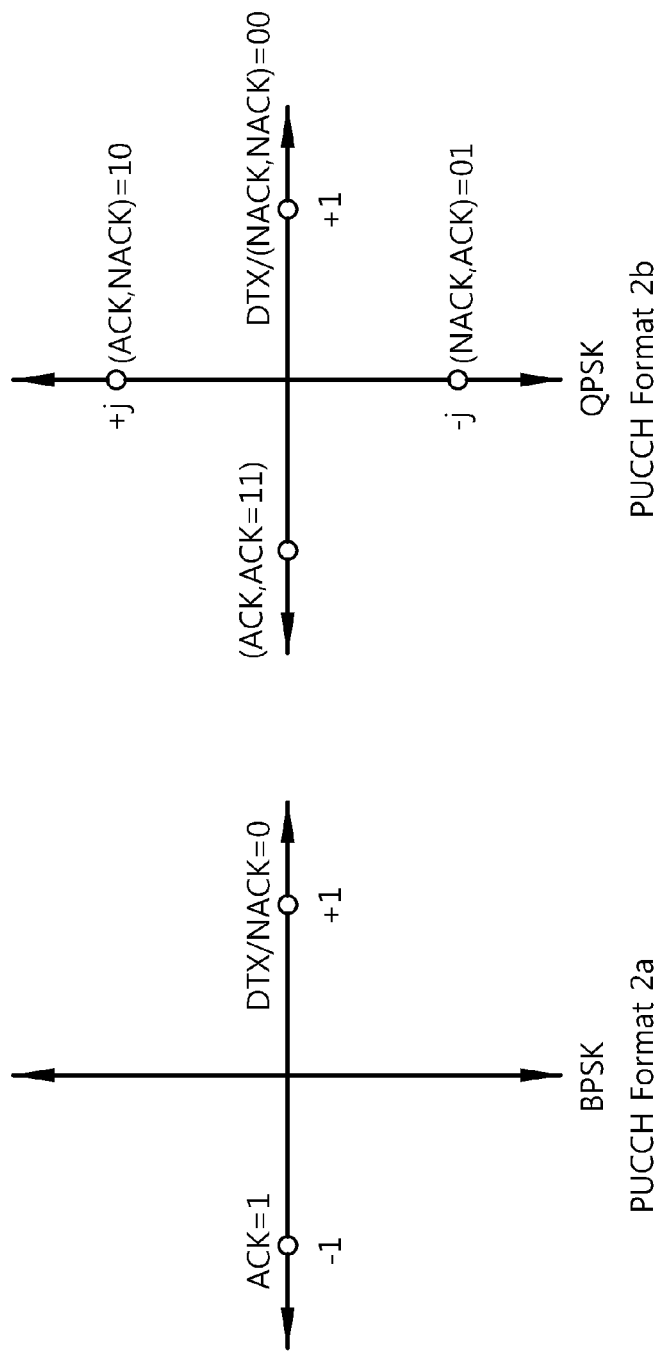
FIG. 8 shows an example of constellation mapping of acknowledgement/not-acknowledgement (ACK/NACK) in a normal CP.

FIG. 8 shows an example of constellation mapping of ACK/NACK in a normal CP.

Referring to FIG. 8, NACK (or NACK, NACK in case of transmitting two DL codewords) is mapped to +1. Discontinuous transmission (DTX) implies a case where a UE fails to detect a DL grant in a PUCCH and where both of ACK are NACK are not necessarily transmitted, which results in a default NACK. In other words, the DTX is interpreted as the NACK by a BS, and triggers DL retransmission.

Next, 1- or 2-bit ACK/NACK is jointly coded with CQI in an extended CP which uses one RS symbol per slot.

Figure 9:
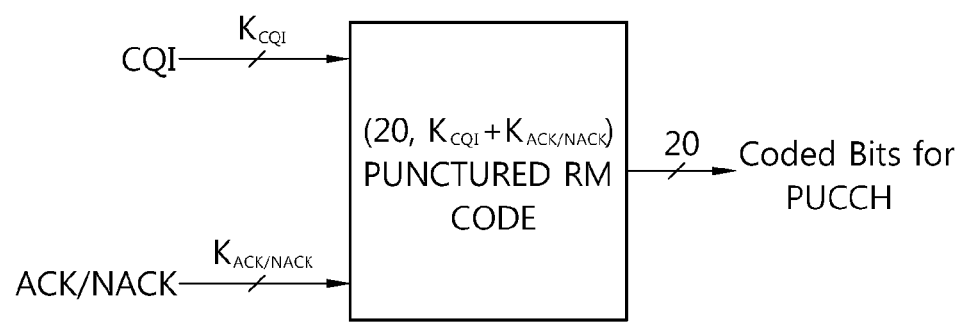
FIG. 9 shows an example of joint encoding between ACK/NACK and a channel quality indicator (CQI) in an extended CP.

FIG. 9 shows an example of joint encoding between ACK/NACK and CQI in an extended CP.

Referring to FIG. 9, a maximum number of bits of an information bit supported by a block code may be 13. In this case, a CQI bit $K_{cqi}$ may be 11 bits, and an ACK/NACK bit $K_{ACK/NACK}$ may be 2 bits. The CQI bit and the ACK/NACK bit are jointly encoded to generate a 20-bit Reed-Muller-based block code. The 20-bit codeword generated in this process is transmitted through a PUCCH having the channel structure described in FIG. 7 (in an extended CP case, one RS symbol is used per slot unlike in FIG. 7).

Now, a multi-carrier system and carrier aggregation will be described.

The conventional 3GPP LTE system supports a case where a DL bandwidth is set differently from a UL bandwidth under the assumption that one carrier is used. That is, it implies that the 3GPP LTE is supported only when the DL bandwidth is different from the UL bandwidth in a situation where one carrier is defined for each of a DL and a UL. For example, the 3GPP LTE system supports up to 20 MHz, and the UL bandwidth and the DL bandwidth may be different from each other, but in this case, only one carrier is supported for the UL and the DL.

On the other hand, the multi-carrier system supports carrier aggregation. The carrier aggregation implies that a broadband can be configured by aggregating multiple narrowband component carriers (CCs). The carrier aggregation can support a throughput that increases by extension of a transmission bandwidth, prevent a cost increase caused by using a broadband radio frequency (RF) element, and ensure compatibility with legacy systems. For example, the extension of the transmission bandwidth can support a bandwidth of up to 100 MHz by aggregating 5 CCs having a bandwidth of 20 MHz.

The carrier aggregation can be classified in a frequency domain into contiguous carrier aggregation which is achieved between contiguous carriers and non-contiguous carrier aggregation which is achieved between non-contiguous carriers. The non-contiguous carrier aggregation is also referred to as spectrum aggregation.

CCs used in carrier aggregation may have the same bandwidth or may have different bandwidths. For example, two 20 MHz CCs can be used to configure a 40 MHz band. Alternatively, one 20 MHz CC and two 10 MHz CCs can be used to configure the 40 MHz band.

In addition, a total bandwidth used in a UL and a total bandwidth used in a DL may be equal to each other or may be different from each other. For example, a total bandwidth of 60 MHz may be used by using three 20 MHz CCs in the UL, and a total bandwidth of 100 MHZ may be used by using five 20 MHz CCs in the DL. Hereinafter, a multiple carrier system refers to a system capable of supporting multiple carriers on the basis of carrier aggregation.

Figure 10:
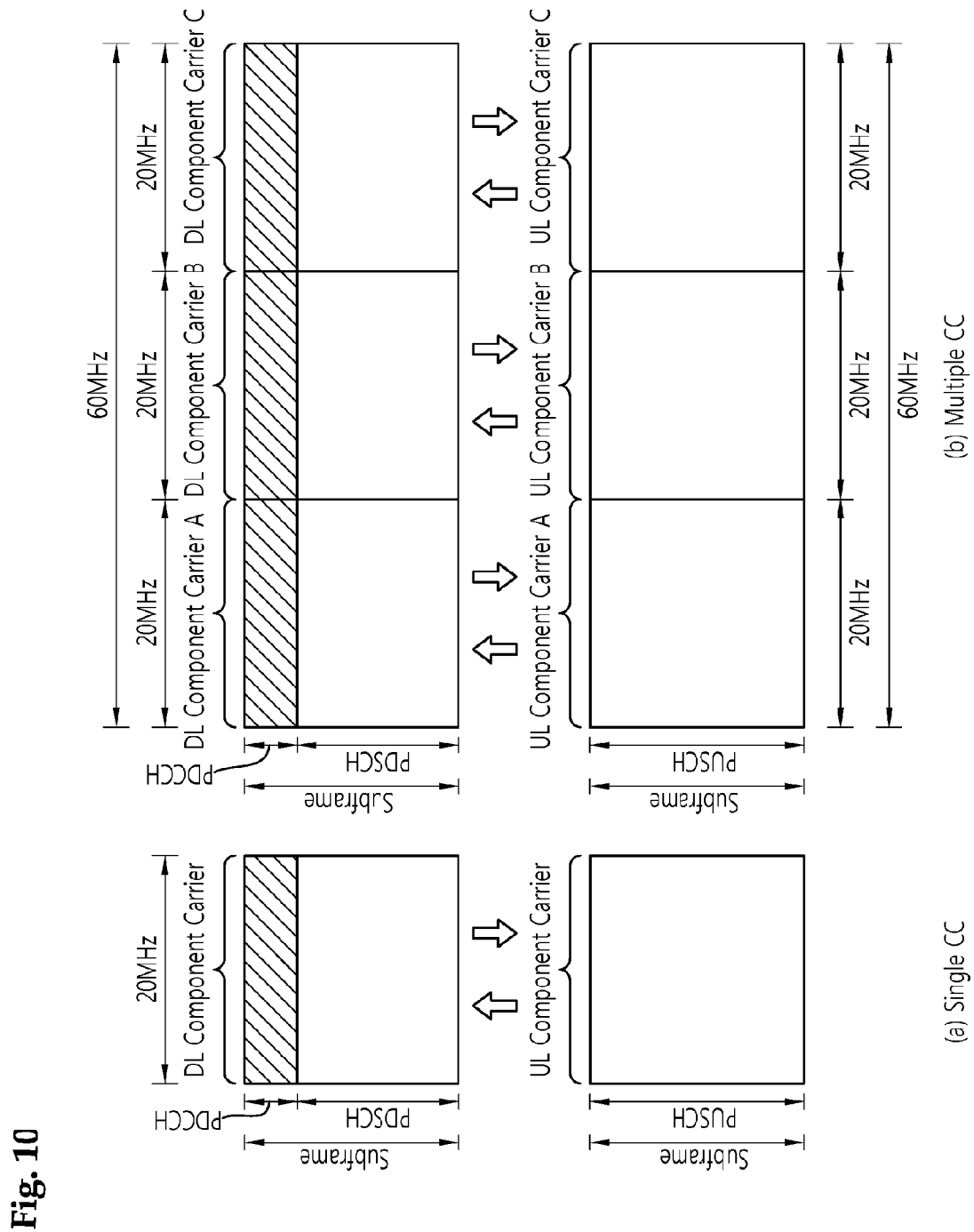
FIG. 10 shows a comparison result of a subframe structure between a single-carrier system and a multi-carrier system.

FIG. 10 shows a comparison result of a subframe structure between a single-carrier system and a multi-carrier system.

FIG. 10(a) shows a DL CC and a UL CC in a single-carrier system using a single carrier. FIG. 10(b) shows a DL CC and a UL CC in a multi-carrier system using multiple carriers by aggregating three carriers having a 20 MHz band.

As shown in FIG. 10(b), in the multi-carrier system, a UE can monitor and receive a DL signal simultaneously through multiple DL CCs. Even if N DL CCs are used in a cell, the UE can be configured to monitor only M DL CCs. Herein, N may be greater than or equal to M. That is, the UE can be configured to monitor only a smaller number of DL CCs than DL CCs used in the cell and to receive a DL signal. In addition, a BS (or a network) can configure L DL CCs (where L≤M≤N) as a main DL CC in which the UE must monitor and receive a DL signal. That is, the L DL CCs can be regarded as a DL CC having a priority. Such a DL CC is referred to a primary DL CC. This configuration can be achieved either UE-specifically or cell-specifically.

In the multi-carrier system (e.g., LTE-A), the UE can receive data from multiple PDSCHs through multiple DL CCs. Therefore, the UE may have to transmit multiple ACK/NACKs through one or multiple UL CCs. Transmitting of the multiple ACK/NACKs by using the conventional PUCCH formats 1a/1b requires greater transmit power and increases in a peak-to-average power ratio (PAPR) of a UL transmission signal. Therefore, the coverage of the UE is decreased due to inefficient utilization of a transmit power amplifier of the UE.

When the multiple ACK/NACKs have to be transmitted, the UE can use ACK/NACK bundling or ACK/NACK multiplexing for single PUCCH transmission. However, if there are too many ACK/NACK bits to be transmitted (e.g., if the number of DL CCs that receive DL data is too many or if the number of DL subframes is greater than the number of UL subframes in a TDD mode), it may be difficult to perform single PUCCH (formats 1a/1b) transmission by using a method of directly applying the ACK/NACK bundling or ACK/NACK multiplexing.

Due to the aforementioned reason, PUCCH formats 2/2a/2b can be taken into consideration to transmit the multiple ACK/NACKs by using the single PUCCH. In this case, instead of CQI information bits of FIG. 7, multiple ACK/NACK bits are channel coded (e.g., with a Reed-Muller code, a tail biting convolution code (TBCC), or the like) to generate 20-bit coded ACK/NACK bits. The coded ACK/NACK bits are scrambled and are mapped to a QPSK symbol. Hereinafter, an operation of a UE for transmitting CQI or SR will be described when the UE is configured to transmit multiple ACK/NACKs by using the PUCCH formats 2/2a/2b.

First, an ACK/NACK multiplexing method in the conventional LTE will be described.

There is a case where a UE has to transmit multiple ACK/NACKs simultaneously for multiple data units received from a BS. In this case, an ACK/NACK multiplexing method based on PUCCH resource selection can be taken into consideration to preserve a single-carrier property and to decrease a total ACK/NACK transmit power when transmitting the multiple ACK/NACKs.

In the ACK/NACK multiplexing method, the content and meaning of the ACK/NACK for the multiple data units can be identified by combining a PUCCH resource used in actual ACK/NACK transmission and one of QPSK modulation symbols.

For example, it is assumed that up to four data units can be transmitted, and one PUCCH resource can carry 4 bits. It is also assumed that an HARQ operation for each data unit can be managed by one ACK/NACK bit. In this case, the ACK/NACK can be identified at a transmitting node (e.g., a BS) which transmits the data unit according to Table 2 below.

TABLE 2

| HARQ-ACK(0), HARQ-ACK(1), HARQ-ACK(2), HARQ-ACK(3) | $n^{(1)}_{PUCCH}$ | b(0), b(1) |
|---|---|---|
| ACK, ACK, ACK, ACK | $n^{(1)}_{PUCCH,1}$ | 1, 1 |
| ACK, ACK, ACK, NACK/DTX | $n^{(1)}_{PUCCH,1}$ | 1, 0 |
| NACK/DTX, NACK/DTX, NACK, DTX | $n^{(1)}_{PUCCH,2}$ | 1, 1 |
| ACK, ACK, NACK/DTX, ACK | $n^{(1)}_{PUCCH,1}$ | 1, 0 |
| NACK, DTX, DTX, DTX | $n^{(1)}_{PUCCH,0}$ | 1, 0 |
| ACK, ACK, NACK/DTX, NACK/DTX | $n^{(1)}_{PUCCH,1}$ | 1, 0 |
| ACK, NACK/DTX, ACK, ACK | $n^{(1)}_{PUCCH,3}$ | 0, 1 |
| NACK/DTX, NACK/DTX, NACK/DTX, NACK | $n^{(1)}_{PUCCH,3}$ | 1, 1 |
| ACK, NACK/DTX, ACK, NACK/DTX | $n^{(1)}_{PUCCH,2}$ | 0, 1 |
| ACK, NACK/DTX, NACK/DTX, ACK | $n^{(1)}_{PUCCH,0}$ | 0, 1 |
| ACK, NACK/DTX, NACK/DTX, NACK/DTX | $n^{(1)}_{PUCCH,0}$ | 1, 1 |
| NACK/DTX, ACK, ACK, ACK | $n^{(1)}_{PUCCH,3}$ | 0, 1 |
| NACK/DTX, NACK, DTX, DTX | $n^{(1)}_{PUCCH,1}$ | 0, 0 |
| NACK/DTX, ACK, ACK, NACK/DTX | $n^{(1)}_{PUCCH,2}$ | 1, 0 |
| NACK/DTX, ACK, NACK/DTX, ACK | $n^{(1)}_{PUCCH,3}$ | 1, 0 |
| NACK/DTX, ACK, NACK/DTX, NACK/DTX | $n^{(1)}_{PUCCH,1}$ | 0, 1 |
| NACK/DTX, NACK/DTX, ACK, ACK | $n^{(1)}_{PUCCH,3}$ | 0, 1 |
| NACK/DTX, NACK/DTX, ACK, NACK/DTX | $n^{(1)}_{PUCCH,2}$ | 0, 0 |
| NACK/DTX, NACK/DTX, NACK/DTX, ACK | $n^{(1)}_{PUCCH,3}$ | 0, 0 |
| DTX, DTX, DTX, DTX | N/A | N/A |

In Table 2, HARQ-ACK(i) indicates an ACK/NACK result for a data unit i. In the above example, four data units may exist, i.e., a data unit 0 to a data unit 3. In Table 2, DTX implies that there is no data unit transmission for the HARQ-ACK(i). Alternatively, it implies that a receiving end (e.g., a UE) fails to detect the data unit for the HARQ-ACK(i). $n^{(1)}_{PUCCH,X}$ indicates a PUCCH resource used in actual ACK/NACK transmission. There are up to 4 PUCCH resources, that is, $n^{(1)}_{PUCCH,0}$, $n^{(1)}_{PUCCH,1}$, $n^{(1)}_{PUCCH,2}$, $n^{(1)}_{PUCCH,3}$. b(0) and b(1) denote 2 bits delivered by a selected PUCCH resource. A modulation symbol transmitted using the PUCCH resource is determined by b(0) and b(1).

For one example, if the receiving end successfully receives four data units and decodes the received data units, the receiving end has to transmit two bits b(0) and b(1) in a form of (1, 1) by using a PUCCH resource $n^{(1)}_{PUCCH,1}$.

For another example, it is assumed that the receiving end receives four data units, and in this case, the receiving end fails to decode $1^{st}$ and $3^{rd}$ data units and successfully decodes $2^{nd}$ and $4^{th}$ data units. Then, the receiving end has to transmit (1, 0) by using $n^{(1)}_{PUCCH,3}$.

As such, according to a method in which the content (or meaning) of ACK/NACK is linked to a combination of a PUCCH resource and the content of an actual bit transmitted using the PUCCH resource, ACK/NACK transmission for the multiple data units is enabled by using a single PUCCH resource.

In the ACK/NACK multiplexing method, if at least one ACK exists for all data units, NACK and DTX are basically coupled as NACK/DTX (see Table 2). This is because a combination of a PUCCH resource and a QPSK symbol is not enough to cover all ACK/NACK combinations based on decoupling of the NACK and the DTX.

On the other hand, if no ACK exists for all data units, that is, only the NACK or the DTX exists for all data units, a single definite NACK is defined. That is, for only one HARQ-ACK (i), a NACK decoupled with the DTX is defined. In this case, a PUCCH resource linked to a data unit corresponding to one definite NACK can be reserved to transmit the multiple ACK/NACKs.

Now, a method of transmitting multiple ACK/NACKs in a multi-carrier system (e.g., LTE-A) will be described.

In the multi-carrier system, it can be considered that multiple ACK/NACKs for multiple PDSCHs transmitted through multiple DL CCs are transmitted through a specific UL CC. For this, unlike ACK/NACK transmission using PUCCH formats 1a/1b in the conventional LTE (Release-8), it can be considered that the multiple ACK/NACKs are channel coded (e.g., with a Reed-Muller code or a TBC code) and are then transmitted by using: 1) the PUCCH formats 2/2a/2b; 2) a new PUCCH format based on block-spreading (for convenience of explanation, referred to as an E-PUCCH format); and 3) explicit channel selection.

In a method of using 1) the PUCCH formats 2/2a/2b, the multiple ACK/NACKs are transmitted after performing channel coding on the conventional PUCCH format 2/2a/2b resources by using the Reed-Muller code, the TBC code, or the like. In the conventional LTE, a CQI is transmitted in the PUCCH formats 2/2a/2b, and a 1-bit or 2-bit ACK/NACK is transmitted by modulating an RS symbol. On the other hand, in the method of using 1) the PUCCH formats 2/2a/2b, an ACK/NACK coding block is transmitted by channel coding the multiple ACK/NACKs instead of the CQI.

A method of using 2) the PUCCH format based on the block spreading (i.e., E-PUCCH format) will be described.

The block spreading is a method of modulating control information (e.g., ACK/NACK, etc.) transmission by using an SC-FDMA scheme, unlike the PUCCH format 1 or 2 series used in the conventional LTE.

Figure 11:
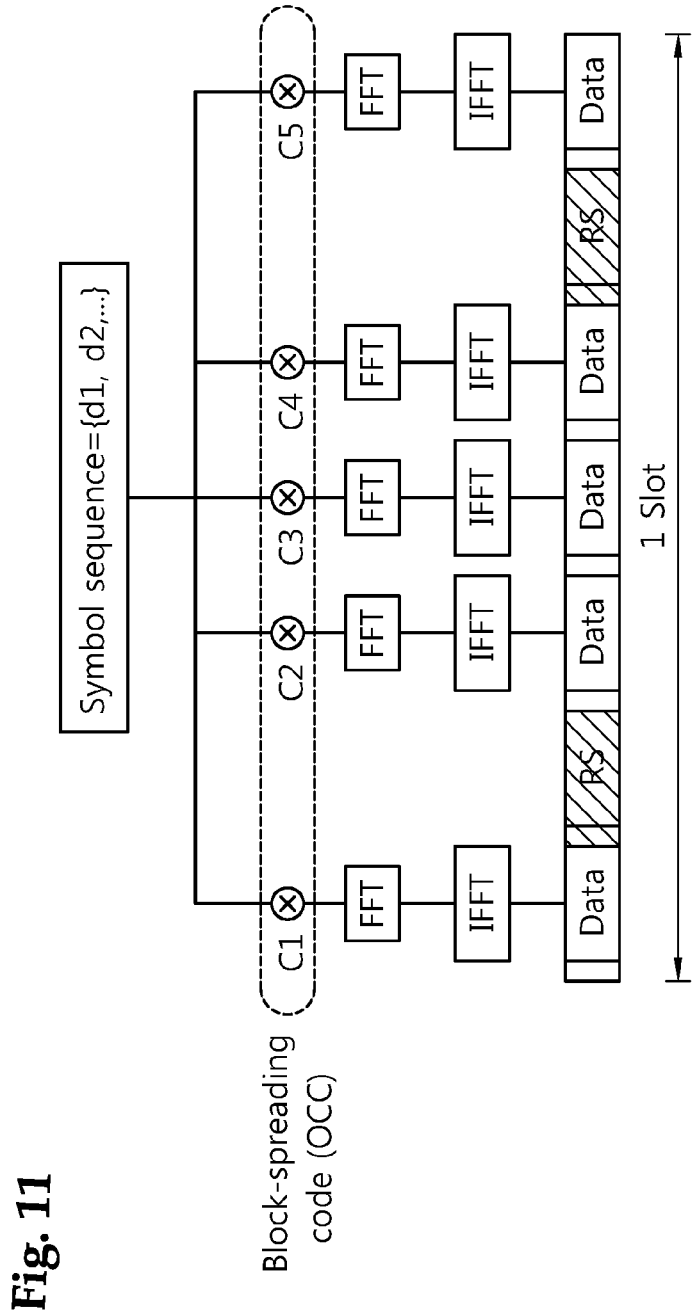
FIG. 11 shows an example of an E-PUCCH format based on block spreading.

FIG. 11 shows an example of an E-PUCCH format based on block spreading.

Referring to FIG. 11, a symbol sequence {d1, d2, . . . } is transmitted by being spread in a time domain by an orthogonal cover code (OCC). By using the OCC, control information of several UEs can be multiplexed in the same RB. In the conventional PUCCH format 2, one symbol sequence is transmitted in a time domain, and multiplexing between UEs is performed by using a cyclic shift of a CAZAC sequence. On the other hand, in case of the E-PUCCH format based on block spreading, one symbol sequence is transmitted in a frequency domain, and multiplexing between UEs is performed by using time-domain spreading based on the OCC. In the example of FIG. 11, one symbol sequence {d1, d2, . . . } is transmitted by generating 5 SC-FDMA symbols by the use of an OCC having a length of 5.

Although an example of using a total of 2 RS symbols during one slot is shown in FIG. 11, various modifications are possible. For example, 3 RS symbols can be used and an OCC having a spreading factor of 4 can be used. The RS symbol can be generated from a CAZAC sequence having a specific cyclic shift, and can be transmitted in such a format that a specific OCC is applied (or multiplied) to multiple RS symbols of the time domain.

A multiple ACK/NACK transmission method based on channel coding and using the PUCCH formats 2/2a/2b or the E-PUCCH format is hereinafter referred to as a 'multi-bit ACK/NACK coding transmission method' for convenience of explanation. This method is a method for transmitting an ACK/NACK coding block generated by performing channel coding on ACK/NACK for a PDSCH of multiple DL CCs or DTX information. For example, if the UE operates in an SU-MIMO mode in a specific DL CC and receives two codewords, any one of four states (e.g., ACK/ACK, ACK/NACK, NACK/ACK, and NACK/NACK) can be fed back for each codeword (or any one of up to 5 states including DTX can be fed back). Alternatively, if the UE receives a single codeword, any one of a total of 3 states (e.g., ACK, NACK, and DTX) can be fed back (if NACK and DTX are equally processed, any one of a total of two states (e.g., ACK and NACK/DTX) can be fed back). For example, in case of assuming a multi-carrier system that aggregates up to 5 DL CCs and operates in the SU-MIMO mode in each DL CC, a feedback state that can be transmitted by the UE is up to $5^5$ states. To express such a state, an ACK/NACK payload size is 12 bits in total (if DTX and NACK are equally processed, the number of feedback states is up to $4^5$, and in this case, the payload size of ACK/NACK is 10 bits).

Now, 3) explicit channel selection will be described.

The ACK/NACK multiplexing method applied to the conventional LTE system (e.g., TDD system) uses a PUCCH resource corresponding to a PDCCH (more specifically, linked to a lowest CCE index of the PDCCH) that schedules a PDSCH of the UE to ensure a PUCCH resource of each UE. That is, a method for implicitly selecting an ACK/NACK transmission resource without signaling an index of a PUCCH resource for explicitly transmitting ACK/NACK is used.

ACK/NACK transmission through one UL CC in a UE-specific manner is taken into consideration in the LTE-A system. In this case, to avoid performance deterioration that may occur by the use of a PUCCH resource in different RBs when the implicit method of the conventional LTE is used, an explicit ACK/NACK transmission resource selection method using a PUCCH resource (i.e., preferably, multiple PUCCH resources existing in the same RB or an adjacent RB) reserved for each UE through RRC signaling or the like is taken into consideration. This is called explicit channel selection. However, the present invention is not limited thereto, and an implicit ACK/NACK transmission resource selection method or a hybrid method can also be used in the LTE-A system. The hybrid method is a method in which the explicit ACK/NACK transmission resource selection is used for a specific CC among multiple CCs and the implicit ACK/NACK transmission resource selection is used for the remaining CCs.

Now, a method of transmitting uplink control information (UCI) by a UE in a multi-carrier system using carrier aggregation will be described.

To preserve a single-carrier property in UL, UCI such as multiple HARQ ACK/NACKs, a channel quality indicator (CQI), a scheduling request (SR) can be configured to be transmitted through a single control channel resource in a subframe, for example, can be configured to be transmitted using resources of the PUCCH formats 2/2a/2b (e.g., in a case where multiple ACK/NACKs are transmitted by using the aforementioned 1) PUCCH formats 2/2a/2b).

Basically, the same or different PUCCH format 2/2a/2b resources can be reserved for multiple ACK/NACKs and CQI feedback in one or multiple UL CCs. However, it is assumed hereinafter that the same PUCCH format 2/2a/2b resources are reserved for multiple ACK/NACK and CQI feedback. If different UCI has the same transmission subframe, for example, if a subframe reserved to transmit the CQI is equal to a subframe reserved to transmit the multiple ACK/NACKs, it is called that collision occurs. The CQI may be dropped at the occurrence of collision when CQI transmission and multiple ACK/NACK transmission are performed in the same subframe.

Figure 12:
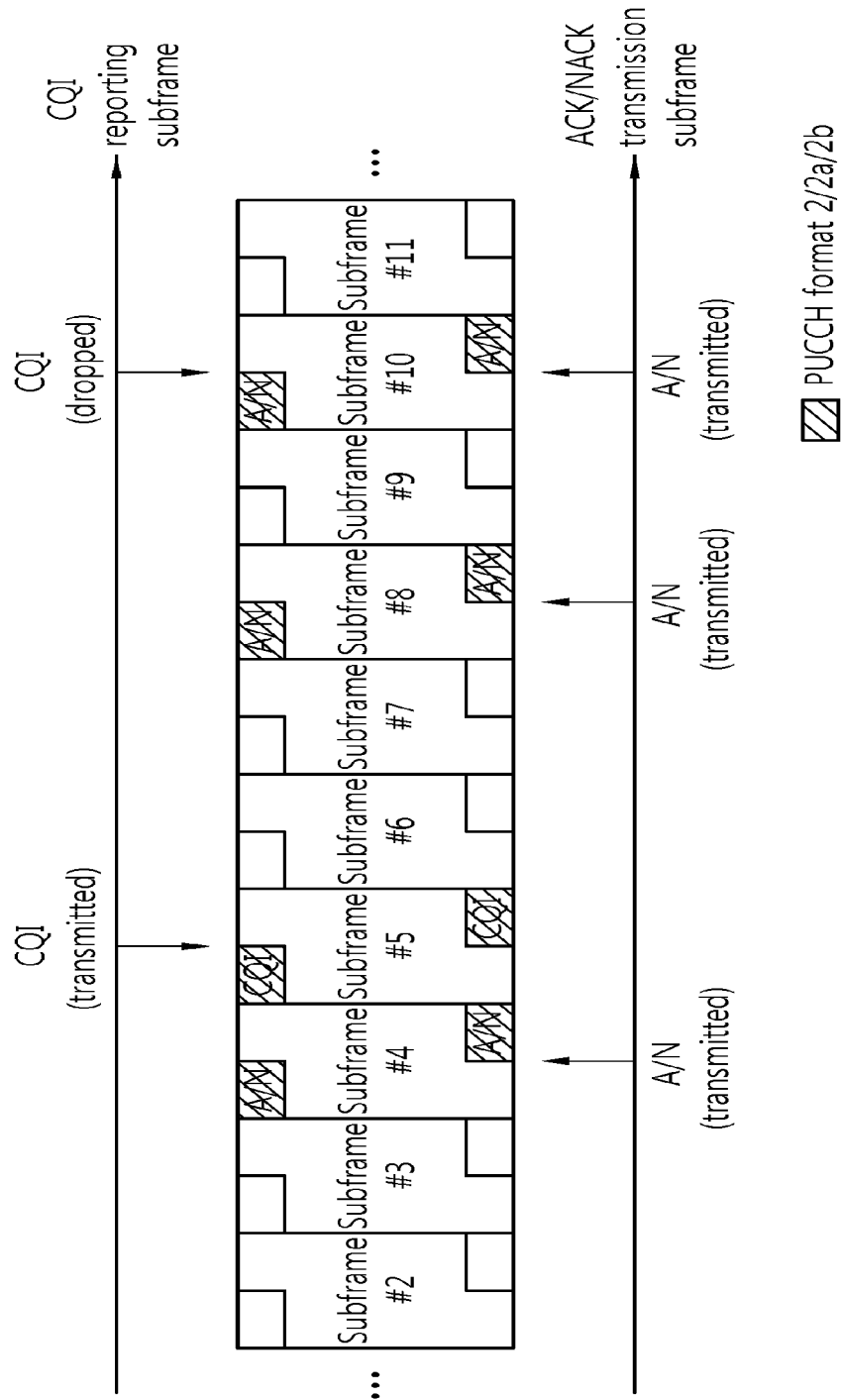
FIG. 12 shows an example of dropping a CQI by a UE in a collision situation in which the CQI and multiple ACK/NACKs are transmitted in the same subframe.

FIG. 12 shows an example of dropping a CQI by a UE in a collision situation in which the CQI and multiple ACK/NACKs are transmitted in the same subframe.

Referring to FIG. 12, a CQI feedback period can be set to 5 subframes (i.e., 5 ms). In addition, the same resource of PUCCH format 2/2a/2b resources can be reserved for multiple ACK/NACK transmission and CQI transmission.

In this case, as shown in FIG. 12, the UE may need to transmit the multiple ACK/NACKs and the CQI simultaneously in a subframe #10. In this case, the UE can drop the CQI for multiple ACK/NACK transmission. This is to preserve a single-carrier property.

However, if the UE does not need to preserve the single-carrier property and different resources of the PUCCH formats 2/2a/2b are reserved for the multiple ACK/NACKs and the CQI, simultaneous transmission may be possible.

Hereinafter, in the collision situation in which a CQI transmission subframe is equal to an ACK/NACK transmission subframe, a case where the ACK/NACK is ACK/NACK for one DL CC will be described.

In a system to which the conventional LTE is applied, only ACK/NACK information for a single CC exists. In the conventional LTE, when an ACK transmission time collides with a CQI transmission time, the ACK/NACK information can be transmitted using RS symbol modulation of the PUCCH formats 2/2a/2b by which the CQI is transmitted (in a normal CP case) or using joint coding (in an extended CP case).

On the other hand, a system to which the LTE-A is applied may be a multi-carrier system using carrier aggregation. Multiple CCs are used when using the carrier aggregation. Since ACK/NACK is required for each CC, it may be need to transmit multiple ACK/NACKs. As described above, in the LTE-A, 1) a multi-bit ACK/NACK coding transmission method (using a PUCCH format 2 series or an E-PUCCH format) or 2) an explicit channel selection method is taken into consideration for multiple ACK/NACK transmission.

In a situation where the multiple ACK/NACKs are transmitted by using the aforementioned two schemes, when an ACK/NACK transmission time collides with a CQI transmission time using the conventional PUCCH format 2, it may be preferable to transmit only the multiple ACK/NACKs while dropping CQI transmission. The reason above is that performance deterioration may occur when multiple ACK/NACK information for multiple CCs is transmitted using joint coding or RS symbol modulation of the PUCCH format 2 by which the CQI is transmitted similarly to the conventional LTE. However, if the CQI is unconditionally dropped in a case where the ACK/NACK transmission time collides with the CQI transmission time, DL scheduling may be delayed due to insufficient CQI information.

Therefore, in a case where a multi-bit ACK/NACK coding transmission method or an explicit channel selection method is applied for multiple ACK/NACK transmission for multiple CCs, if transmission of ACK/NACK for one or less CC or 2-bit (or less) ACK/NACK information is required at a CQI transmission time, the present invention transmits the ACK/NACK by using RS symbol modulation of the PUCCH format 2 by which the CQI is transmitted (in a normal CP case) or by using joint coding (in an extended CP case), instead of dropping the CQI. Hereinafter, the RS symbol modulation or joint coding is simply referred to as ACK/NACK embedding. The case where the 2-bit (or less) ACK/NACK transmission is required may be limited to a case where the number of DL CCs aggregated by the UE is 2 (or 1), and a transmission mode is set to not a MIMO transmission mode but a non-MIMO transmission mode in each DL CC. That is, it can be limited to a case where up to only one codeword can be transmitted in each DL CC.

In this case, in an ACK/NACK embedding scheme using the PUCCH format 2, one DL CC to be subjected to ACK/NACK embedding (i.e., a DL CC that transmits a DL data unit to be subjected to ACK/NACK embedding) can be limited only to a DL CC linked to a UL CC in which a PUCCH is transmitted. Further, whether to apply the ACK/NACK embedding scheme can be configured by a BS in a UE-specific manner by using a higher layer signal such as RRC.

For example, it is assumed that DL CCs are a DL CC#1 to a DL CC #3, and UL CCs are a UL CC#1 to a UL CC #3. It is also assumed that the DL CC#2 is a DL CC that transmits a PDCCH for a specific UE, that is, a primary DL CC. In addition, it is also assumed that a DL CC#n is linked to a UL CC#n (where n is any natural number in the range of 1 to 3). In this case, it may be need to transmit only ACK/NACK for DL data received through the DL CC#2 in a CQI transmission subframe. Herein, the UE transmits the CQI instead of dropping the CQI, and transmits ACK/NACK for the DL CC#2 by embedding the ACK/NACK.

Hereinafter, a UCI transmission method of a UE when collision occurs in transmission of SR and multiple ACK/NACKs and in transmission of SR and CQI.

Figure 13:
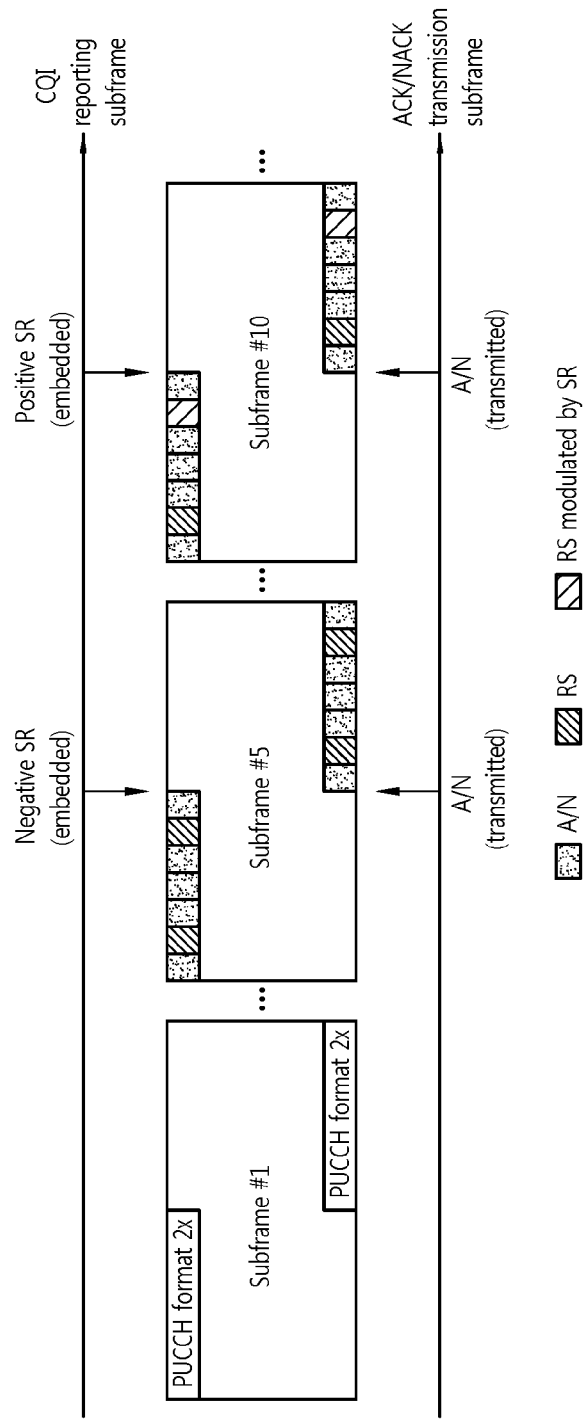
FIG. 13 shows an example of transmitting an SR by embedding it in a PUCCH format 2/2a/2b resource for carrying multiple ACK/NACKs (in a normal CP case).

FIG. 13 shows an example of transmitting an SR by embedding it in a PUCCH format 2/2a/2b resource for carrying multiple ACK/NACKs (in a normal CP case).

Referring to FIG. 13, a period of a subframe capable of transmitting the SR may be set to 5 ms (i.e., 5 subframes). In this case, as shown in FIG. 12, SR transmission and ACK/NACK transmission can be simultaneously required in subframes #5 and #10. Regarding the SR, a negative SR may have to be transmitted in the subframe #5, and a positive SR may have to be transmitted in the subframe #10. In this case, 1-bit SR information can be transmitted together with multiple ACK/NACKs in the same PUCCH format 2a/2b resource. The 1-bit SR transmission can be transmitted by modulating a $2^{nd}$ RS symbol in the PUCCH format 2a/2b resource. For example, the negative SR and the positive SR can be distinguished by transmitting the $2^{nd}$ RS symbol by the use of BPSK similarly to the case of FIG. 8.

This method can also apply to a case where the SR is transmitted in the same PUCCH resource together with the CQI. For example, if the PUCCH format 2 a/2b resource is reserved or configured to report CQI feedback, the 1-bit SR information can be transmitted together with the CQI by being embedded in such a manner that a $2^{nd}$ RS symbol of a slot is modulated.

Unlike the aforementioned normal CP case, when using the extended CP, the 1-bit SR information can be transmitted by being jointly encoded with multiple ACK/NACKs or a CQI by the use of a Reed-Muller code, TBCC, etc. The joint encoding is described above with reference to FIG. 9.

According to the aforementioned method, two different types of UCI (e.g., the SR and the multiple ACK/NACKs, or the SR and the CQI) can be transmitted in the same PUCCH format 2a/2b resource.

The SR embedding scheme of the PUCCH format 2a/2b resource used for CQI transmission can apply only to a case where the multiple ACK/NACKs are not transmitted in a corresponding subframe.

The aforementioned ACK/NACK embedding scheme can be used by combining with an SR embedding scheme of the PUCCH format 2 used for CQI transmission. For example, the ACK/NACK embedding scheme of the PUCCH format 2 can be used in a CQI transmission subframe which does not collide with an SR transmission subframe, and the SR embedding scheme of the PUCCH format 2 can be used in a CQI transmission subframe which collides with an SR transmission subframe. Herein, the SR embedding scheme of the PUCCH format 2 can apply only to a case where ACK/NACK information to be transmitted through a corresponding subframe does not exist.

Figure 14:
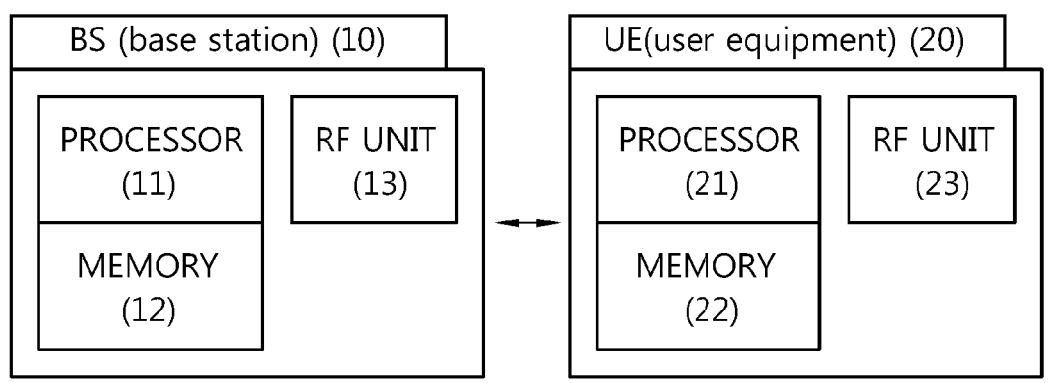
FIG. 14 is a block diagram showing a base station and a user equipment.

FIG. 14 is a block diagram showing a BS and a UE.

A BS 100 includes a processor 110, a memory 120, and a radio frequency (RF) unit 130. The processor 110 implements the proposed functions, procedures, and/or methods. For example, a method of UCI transmission can be reported to a UE by using a higher layer signal such as RRC. The memory 120 coupled to the processor 110 stores a variety of information for driving the processor 110. The RF unit 130 coupled to the processor 110 transmits and/or receives a radio signal.

A UE 200 includes a processor 210, a memory 220, and an RF unit 230. The processor 210 implements the proposed functions, procedures, and/or methods. For example, the processor 210 transmits ACK/NACK for each DL data transmitted by a BS through multiple DL CCs, that is, transmits multiple ACK/NACKs by using the same UL control channel resource in the same subframe. In addition, the processor 210 transmits channel state information indicating a state of a DL channel to the BS. In this case, the multiple ACK/NACKs and the channel state information can be allocated to the same UL control channel in the subframe. When the multiple ACK/NACKs and the channel state information are reserved to be transmitted in the same subframe, the processor can transmit only the multiple ACK/NACKs.

The memory 220 coupled to the processor 210 stores a variety of information for driving the processor 210. The RF unit 230 coupled to the processor 210 transmits and/or receives a radio signal.

The processors 110 and 210 may include an application-specific integrated circuit (ASIC), a separate chipset, a logic circuit, a data processing unit, and/or a converter for mutually converting a baseband signal and a radio signal. The OFDM transmitter and OFDM receiver of FIG. 7 can be implemented in the processors 110 and 210. The memories 120 and 220 may include a read-only memory (ROM), a random access memory (RAM), a flash memory, a memory card, a storage medium, and/or other equivalent storage devices. The RF units 130 and 230 may include one or more antenna ports for transmitting and/or receiving a radio signal. When the embodiment of the present invention is implemented in software, the aforementioned methods can be implemented with a module (i.e., process, function, etc.) for performing the aforementioned functions. The module may be stored in the memories 120 and 220 and may be performed by the processors 110 and 210. The memories 120 and 220 may be located inside or outside the processors 110 and 210, and may be coupled to the processors 110 and 210 by using various well-known means.

While the present invention has been particularly shown and described with reference to exemplary embodiments thereof, it will be understood by those skilled in the art that various changes in form and details may be made therein without departing from the spirit and scope of the invention as defined by the appended claims. The exemplary embodiments should be considered in descriptive sense only and not for purposes of limitation. Therefore, the scope of the invention is defined not by the detailed description of the invention but by the appended claims, and all differences within the scope will be construed as being included in the present invention.

The invention claimed is:

1. A method for transmitting uplink control information of a user equipment (UE) in a wireless communication system supporting carrier aggregation (CA) and orthogonal frequency division multiplexing (OFDM), the method comprising:

receiving, by the UE, downlink data through at least one of a first cell and a second cell from a base station; and performing a procedure for transmitting periodic channel state information (CSI) and for transmitting an acknowledgement/not-acknowledgement (ACK/NACK) for the downlink data to the base station, wherein the first cell comprises a first downlink component carrier (first DL CC) and a first uplink component carrier (first UL CC), and the second cell comprises a second DL CC, wherein, when a transmission of the ACK/NACK will collide with a transmission of the periodic CSI in a subframe and when the ACK/NACK corresponds to downlink data transmitted from the base station to the UE through only the first DL CC, the ACK/NACK and the periodic CSI are both transmitted in a physical uplink control channel (PUCCH) of the subframe through the first UL CC, and wherein, when the transmission of the ACK/NACK will collide with the transmission of the periodic CSI in the subframe and when the ACK/NACK corresponds to downlink data transmitted from the base station to the UE through both the first DL CC and the second DL CC, the periodic CSI is not transmitted and only the ACK/NACK is transmitted in the PUCCH of the subframe through the first UL CC.

2. The method of claim 1, further comprising:
receiving a higher layer signal indicating whether the periodic CSI and the ACK/NACK are to be transmitted simultaneously in a same subframe.

3. The method of claim 1, wherein the first DL CC is a downlink component carrier linked to the first UL CC.

4. The method of claim 1, wherein the downlink data is received through a physical downlink shared channel (PDSCH) of the first DL CC.

5. The method of claim 1, wherein the subframe comprises a physical uplink shared channel (PUSCH) and the PUCCH.

6. The method of claim 1, wherein the periodic CSI comprises at least one among channel quality indicator (CQI), precoding matrix indicator (PMI) and rank indication (RI).

7. A user equipment (UE) for transmitting uplink control information in a wireless communication system supporting carrier aggregation, the UE comprising:

a radio frequency (RF) unit for transmitting and receiving a radio signal; and a processor coupled to the RF unit, wherein the processor is configured to:
receive downlink data through at least one of a first cell and a second cell from a base station, and perform a procedure for transmitting periodic channel state information (CSI) and for transmitting an acknowledgement/not-acknowledgement (ACK/NACK) for the downlink data to the base station, wherein the first cell comprises a first downlink component carrier (first DL CC) and a first uplink component carrier (first UL CC), and the second cell comprises a second DL CC, wherein, when a transmission of the ACK/NACK will collide with a transmission of the periodic CSI in a subframe and when the ACK/NACK corresponds to downlink data transmitted from the base station to the UE through only the first DL CC, the ACK/NACK and the periodic CSI are both transmitted in a physical uplink control channel (PUCCH) of the subframe through the first UL CC, and wherein, when the transmission of the ACK/NACK will collide with the transmission of the periodic CSI in the subframe and when the ACK/NACK corresponds to downlink data transmitted from the base station to the UE through both the first DL CC and the second DL CC, the periodic CSI is not transmitted and only the ACK/NACK is transmitted in the PUCCH of the subframe through the first UL CC.

8. The UE of the claim 7, wherein the periodic CSI comprises at least one among channel quality indicator (CQI), precoding matrix indicator (PMI) and rank indication (RI).

* * * * *